United States Patent [19]

Hashimoto et al.

[11] Patent Number: 5,837,323
[45] Date of Patent: *Nov. 17, 1998

[54] SURFACE IMPROVING METHOD OF POLYPROPYLENE PRODUCTS FOR PLATING, JOINING OR COATING

[75] Inventors: Tugio Hashimoto, Takaishi; Matagoro Maeno, Izumi; Ryoji Hirayama, Sakai, all of Japan

[73] Assignee: Hashimoto Chemical Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 516,335

[22] Filed: Aug. 17, 1995

[30] Foreign Application Priority Data

Sep. 1, 1994 [JP] Japan .................................. 6-234011
May 10, 1995 [JP] Japan .................................. 7-137305

[51] Int. Cl.⁶ ...................................................... B05D 3/04
[52] U.S. Cl. ............................................ 427/322; 427/444
[58] Field of Search ...................................... 427/532, 322, 427/444, 248.1, 430.1, 421

[56] References Cited

FOREIGN PATENT DOCUMENTS

| 585662A1 | 3/1994 | European Pat. Off. . |
| 629654A1 | 12/1994 | European Pat. Off. . |
| 64-66246 | 3/1989 | Japan . |
| 3-126734 | 5/1991 | Japan . |
| 4-59838 | 2/1992 | Japan . |

OTHER PUBLICATIONS

Krueger, "Fluorination of Polypropylene", Adhaes.—Kleben Dichten, 37(3), 1993, pp. 30–33 (Abstract only).

*Primary Examiner*—Roy V. King
*Attorney, Agent, or Firm*—Nikaido Marmelstein Murray & Oram, LLP.

[57] ABSTRACT

A method of improving the surface of polypropylene product characterized is that the surface of polypropylene product is improved by contacting with diluted fluorine gas of concentration of 0.1–10% for 1–30 minutes to make it hydrophilic with the surface contact angle 80 degrees or less.

1 Claim, 3 Drawing Sheets

SURFACE IMPROVING METHOD OF POLYPROPYLENE PRODUCTS FOR PLATING, JOINING OR COATING

BACKGROUND OF THE INVENTION

Field of the Invention

The present invention relates to a surface improving method for plating on the surface of polypropylene, joining polypropylene to polypropylene or the same to other resins, metals or the like, and coating.

The surface of polypropylene is hydrophobic and cannot be plated, joined or coated. For plating the surface of polypropylene, there is known a method in which the surface of polypropylene is polarized and roughened by etching with chromium sulfuric acid solution with $SO_3$ gas or the like.

For adhesion, the surface of polypropylene product is etched similarly, and then primed on the etched surface and followed to join with adhesives. These pre-treating, however, are not good for all grades of polypropylene and there are many problems about such as cost, facilities and environmental countermeasures.

When polypropylene is coated, the layer weak in cohesive force (WBL) existing hitherto in polypropylene surface is removed with trichloroethylene, this followed by regular coating after priming. This method, however, cannot be used hereinafter, because it employs trichloroethylene, a manufacture and use of trichloroethylene are prohibited as deteriorating the earth's environment.

The object of the invention is to provide a method of readily improving the surface of polypropylene by the use of fluorine gas to afford hydrophilic property and to follow enabling of plating, joining and coating thereon.

SUMMARY OF THE INVENTION

These objects can be achieved by treating polypropylene products by diluted fluorine gas in a concentration of 0.1–10% fluorine for 1–30 minutes, preferably 1–15 minutes and making it hydrophilic with the surface contact angle 80 degrees or less to water.

It is well known to treat the surface of polyolefin resin with fluorine gas to make it hydrophobic and water repellent to be good as material of container for gasoline. It was, however, unknown that this material is made hydrophilic when polyolefin resin is treated with fluorine gas. It is that under conditions of high fluorine concentration and high temperature the hydrogen atoms in polyolefin resin are all replaced with fluorine atoms to be water-repellent.

The present inventors discovered that by treating a polypropylene products with diluted fluorine gas especially under fluorine concentration of 0.1–10% for 1–30 minutes or more preferably for 1–15 minutes, it is possible to make its surface hydrophilic and make its contact angle to be less that 80 degrees and it is possible to plate its surface with a metal film with a good adhesiveness thereto. They also discovered that when an adhesive is applied to the surface of polypropylene product and on it is deposited polypropylene likely improved or other resins or metal films, good adhesive force is exhibited. Further, they discovered that direct coating for polypropylene product thus improved is feasible without priming.

It was also discovered by the present inventors that when polypropylene product is improved by diluted fluorine gas, at normal temperature for a short time, contact angle of the surface of polypropylene product to water tends to become low to less than 80 degrees whereas it is normally 90–100 degrees and in some cases even to less than 70 degrees.

Fluorination of polypropylene homopolymer was carried out for 10 minutes at a room temperature in which fluorine concentrations were changed, and its influence on the contact angle was studied. The result was as shown in Table 1.

TABLE 1

| | Fluorine concentration (%) | | | | | |
|---|---|---|---|---|---|---|
| | 0 | 0.5 | 1.0 | 2.0 | 10.0 | 20.0 |
| Contact angle (degree) | 99.6 | 62.6 | 64.6 | 69.0 | 79.9 | 90.0 |

It was noticed that the contact angle increases with increasing fluorine concentration.

With a fluorine concentration of 2%, the contact angle was measured by changing the fluorinating time and the result was as shown in Table 2. It showed that the contact angle increases with the lapse of time.

TABLE 2

| | Fluorinating time (min.) | | | |
|---|---|---|---|---|
| | 0 | 1 | 10 | 30 |
| Contact angle (degree) | 99.6 | 66.0 | 69.0 | 71.0 |

It became apparent that Table 1 is the result when "Homopolymer J115G" was used as polypropylene product at the room temperature, while Table 2 is essentially the same as Table 1 except that the fluorinating time alone was changed at the fluorinating concentration of 2% in Table 1.

It also became apparent from the result of MSCA measurement that fluorine atoms and carbon atoms were formed by a covalent bond in the form of —CHF— CHF or $CH_2$—$CF_2$, when the hydrogen atoms in polypropylene are replaced mildly with a diluted gas containing fluorine and nitrogen. The result of MSCA measurement is shown in FIGS. 1–3.

BRIEF DESCRIPTION OF THE DRAWINGS

FIG. 1 is a spectrum taken along the depth of the surface. The spectrum $F_1s$ has its strength greatest at the top layer of the surface and quick to attenuate. This shows that the extremely top layer of the surface alone is fluorinated.

FIG. 2 shows the bonding energy of $F_1s$ and that the absorption at 691 eV indicates that fluorine atoms are bonded in the form of a covalent bond with carbon atoms.

FIG. 3 shows the bonding energy of carbon atom $C_1s$. The absorption at 287.9 eV indicates that carbon atoms are bonded with fluorine atoms in the form of a —C—$CF_2$—. The absorption at 286.8 eV indicates that —CFH—CFH— group has an ionic bond. However this absorption are measured in the place of lower energy than that of a true covalent bond. And also the result shows that the —CFH—CHF— group is ionized.

Figure 1:
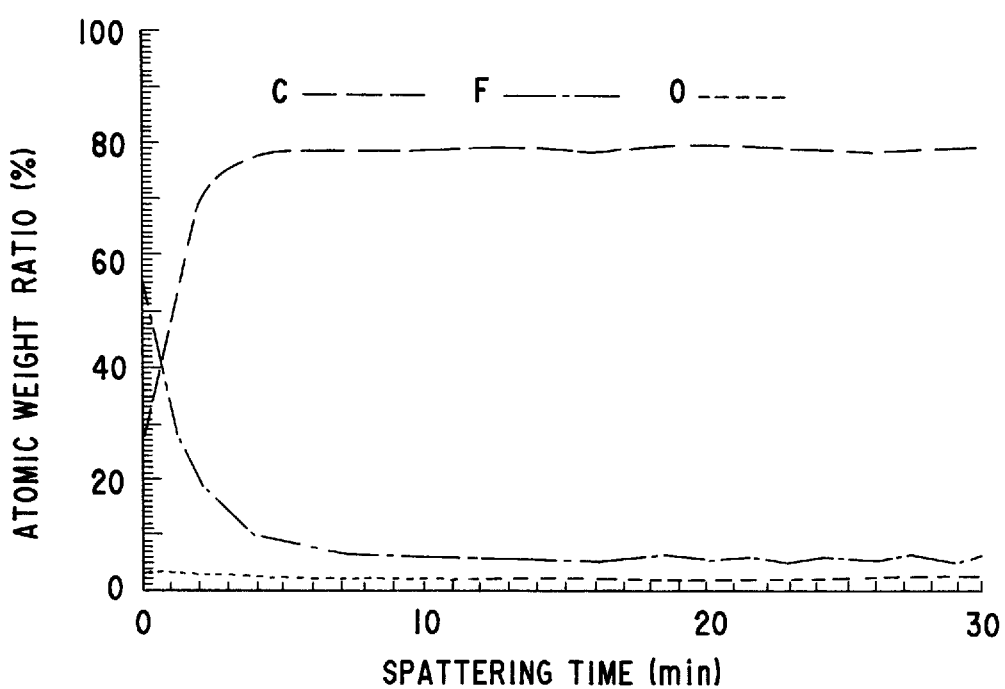
FIG. 1 A graph showing the result of measurement of ESCA of fluorine-treated polypropylene shaped product being a spectrum of fluorine ($F_1s$) along the depth from the surface.
Figure 2:
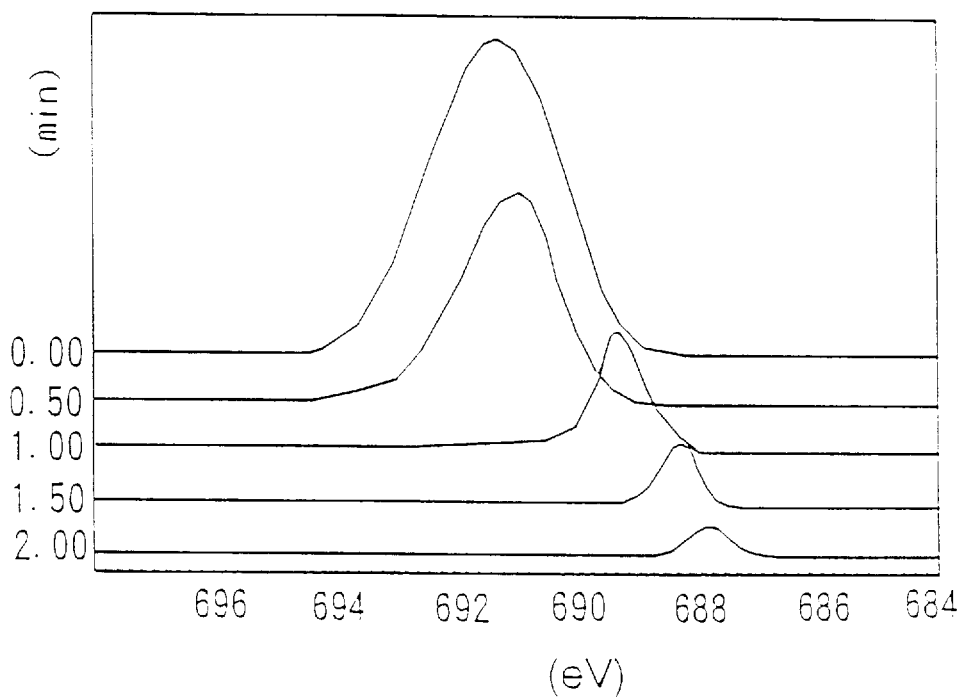
FIG. 2 Another graph showing the result of measurement of ESCA of fluorine-treated polypropylene product, indicating the bonding energy of fluorine ($F_1s$).
Figure 3:
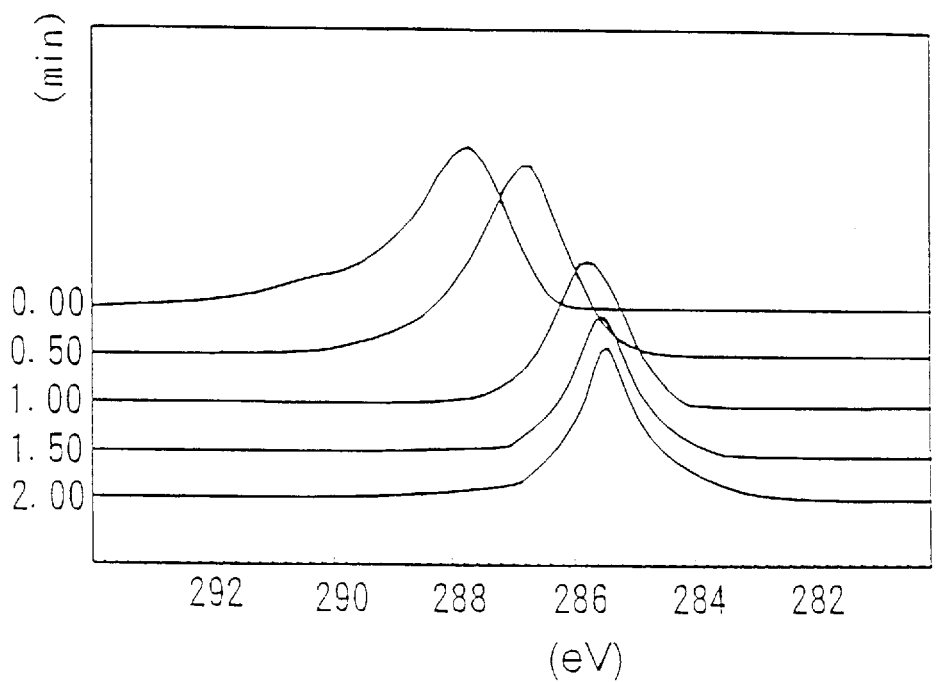
FIG. 3 Still another graph showing the result of measurement of ESCA of fluorine-treated polypropylene shaped product, indicating the bonding energy of carbon ($C_1s$).

Also the contact angle was measured with methylene iodide and water as solvents and the surface energy was calculated from such data. The result was shown in Table 3.

The surface energy (mJ/m$^2$)=dispersion force component ($\gamma_1$)+polar force component ($\gamma_2$).

TABLE 3

| | Surface energy (mJ/m$^2$) | | |
|---|---|---|---|
| Sample: | Dispersion force component ($\gamma_1$) | Polar force component ($\gamma_2$) | Total ($\gamma$) |
| Blank | 29.7 | 1.6 | 31.3 |
| Fluorinated sample | 22.4 | 25.0 | 47.4 |

As is apparent from Table 3, the surface energy's polar force component is increased from 1.6 mJ/m$^2$ to 25.0 mJ/m$^2$ and the solid surface energy is markedly increased from 31.3 mJ/m$^2$ to 47.7 mJ/m$^2$, this indicating that the surface is polarized.

Polarization of the hydrophilic surface of polypropylene is supposed to be due to localization of electrons and resulting ionization due to fluorine atoms showing maximum electronegativity in the C—F bond.

Further, electron microscopic pictures were taken before and after fluorination of polypropylene surface and the surface condition was studied but no difference in surface roughness was noticeable.

The conventional surface treating methods enable polarization but at the same time the surface was roughened by etching. It was, therefore, supposed that securing of metal coating and of paint layer to the substrate was attributable to the surface's polarity and anchoring effect.

The surface of polypropylene fluorinated by the improving method of the present invention is, however, flat, hence it is presumed that the plating metal ions are deposited due to strong polarity created by fluorine, this resulting in secure anchoring of metal film to the substrate. Since longer treatment with a highly concentrated fluorine gas tends to make the treated surface water-repellent, it is advisable to use the concentration of fluorine gas in a range of 0.1–10%, preferably 0.5–5% and treat to make the surface hydrophilic for 1–30 min., preferably 1–15 min. and more preferably 1–10 min.

After treating the surface of polypropylene with fluorine gas, the surface was chemically plated and a peeling test was made by the method of JIC H-8630. In the test no peeling occurred when the contact angle was no more than 80 degrees, while no deposition of metal ions took place when the contact angle was in excess of 80 degrees.

The surface of polypropylene was treated with diluted fluorine gas, an adhesive was applied thereon and a sheet of polypropylene or metal likely treated was stuck thereto and with it was made a pulling test for determination of adhesion strength by the pulling test of JIS K-6850. The result was good when the contact angle was no more than 80 degrees.

Even when the polypropylene surface not improved with fluorine was coated with [Allardite] (trade name, an epoxy type adhesive) sheet-like peeling took place after complete drying of the adhesive, this resulting in total adhesion failure.

The surface of polypropylene was improved with fluorine and then coated by spraying with an urethane paint and after drying was baked for 30 minutes at 80° C. In the peeling test according to JIS K 5400 (8.5) there was no indication of peeling.

Polypropylene of the present invention includes not only homopolymers but also copolymers. As copolymers are included random copolymers and block copolymers and as monomer other than polypropylene there is ethylene.

As fluorine concentration of 0.1–10% in this invention is meant comprising 0.1–10% of fluorine gas, the rest being other inert gases such as N$_2$, argon and helium. If its concentration is less than 0.1%, it is difficult to obtain the desired effects, while, if its concentration is higher than 10%, it is unable to make the contact angle 80 degrees or less.

The means of bringing polypropylene product to contact with fluorine gas is not limited and any means will be employed, if the entire surface of polypropylene product is brought to contact with fluorine therewith.

Polypropylene product with its surface improved by the method of the present invention may have its surface plated or made joinable by means of an adhesive. Its surface may be directly coated even without any priming.

Applying plating may be done by any of the hitherto known methods but normally preferred is an chemical plating method.

In joining a polypropylene product to a polypropylene product improved by the method of this invention, the former, too, may preferably be improved by the method of the invention.

Adhesion is feasible also with various products of other material such as of other synthetic resins, metals, ceramics or woods by usual shaping methods.

Adhesion methods and adhesives to be used may properly be selected among various known methods and adhesives.

Adhesion may be done using an adhesive with or without priming. Adhesives usable may not be particularly limited. For example, those of epoxy type or cyanoacrylate type may be employed as preferable.

Coating may be done with the surface of polypropylene product treated by the method of the present invention with or without priming in any of proper coating means. For this coating various kinds of coatings are usable, for example, polyurethane paints. As coating means any of various known means may be usable such as brushing, spray coating, dip-coating.

DETAILED DESCRIPTION OF THE PREFERRED EXAMPLES

Referring to the examples below, the present invention will be described in greater details.

Example 1

The three kinds of polypropylene sheets were put into a container, which was then evacuated. Into this evacuated container a mixed gas of 1% F$_2$/99% N$_2$ or 5% F$_2$/95% N$_2$ was then introduced and after 10 minutes the sample was taken out of the container after substituting the mixed gas with nitrogen and the contact angle was measured. The contact angle was measured using superpure water by the use of a CA-DT type contact angle measuring device (Kyowa Kaimen Kagaku, Ltd.).

The polypropylene samples used were as follows:

A: Ethylene/propylene block polymer
B: Ethylene/propylene random polymer
C: Homopolymer
BL: Blank values (Untreated)
1. 1% F$_2$/99% N$_2$
2. 5% F$_2$/95% N$_2$
The results were as shown in Table 4.

TABLE 4

| Sample | Angle of contact (degree) | | | | | Average |
|---|---|---|---|---|---|---|
| A:BL | 92 | 94 | 91 | 97 | 96 | 94.0 |
|      | 92 | 94 | 93 | 96 | 95 | 94.0 |
| B:BL | 96 | 92 | 98 | 96 | 97 | 96.3 |
|      | 95 | 97 | 98 | 97 | 97 | 97.0 |
| C:BL | 68 | 86 | 94 | 92 | 93 | 90.3 |
|      | 90 | 90 | 86 | 89 | 91 | 89.7 |
| A: 1 | 68 | 68 | 62 | 57 | 54 | 62.3 |
|      | 70 | 71 | 71 | 71 | 70 | 70.6 |
| B: 1 | 61 | 73 | 71 | 70 | 70 | 70.3 |
|      | 67 | 67 | 69 | 69 | 69 | 67.6 |
| C: 1 | 55 | 60 | 59 | 60 | 53 | 58.0 |
|      | 61 | 67 | 50 | 63 | 40 | 58.0 |
| A: 2 | 77 | 76 | 75 | 76 | 74 | 75.6 |
|      | 75 | 71 | 62 | 71 | 71 | 71.0 |
| B: 2 | 70 | 77 | 77 | 77 | 77 | 77.0 |
|      | 65 | 77 | 77 | 77 | 76 | 76.6 |
| C: 2 | 78 | 80 | 80 | 80 | 80 | 79.9 |
|      | 76 | 78 | 80 | 80 | 79 | 79.9 |

These contact angles were not varied when measured 1.5 months later, this ensuring against change with time of the fluorinated surface.

Example 2

The homopolymer used was the same as in Example 1, the treatment was done under the same conditions without treating time as in Example 1 and the contact angles were measured.

(1): 1% $F_2$/99% $N_2$
(2): 5% $F_2$/95% $N_2$

The result was as shown in Table 5.

TABLE 5

|        | 1 min. | 10 min. | 15 min. |
|---|---|---|---|
| (C) ① | 67 | 58 | 78 |
| (C) ② | 80 | 80 | 80 |

Example 3

The sample obtained in Example 1 was chemically plated with nickel. After rinsing of the surface of the sample with superpure water it was immersed in a solution of zinc chloride ($SnCl_2$: 40 g/L, HCl (37%): 40 mL/L) for 3 minutes at the room temperature. The sample was then again rinsed with water and was immersed in a solution of palladium chloride ($PdCl_2$: 0.2 g/L, HCl (37%): 3 mL/L) for 3 minutes at the room temperature. After still another rinsing, the plated sample was immersed in a nickel plating bath (nickel hypophosphite: 26.7 g/L, boric acid: 12.0 g/L, ammonium sulfate: 2.6 g/L, sodium sulfate: 4.9 g/L) for 1 hour at 25°–30° C. The plated sample was stabilized for 1 hour at 60° C. and then cross-notched at intervals of 1 mm, an adhesive tape was pressed on and pulled off and the number of lattices (100 pieces in total) peeled off was counted. The test result was as shown in Table 6.0% means no lattice peeled off.

TABLE 6

| Sample | Contact angle (degree) | Peeling rate (%) |
|---|---|---|
| A:BL | 94.0 | 100 |
| B:BL | 96.3 | 100 |
| C:BL | 90.3 | 100 |

TABLE 6-continued

| Sample | Contact angle (degree) | Peeling rate (%) |
|---|---|---|
| A: 1 | 62.3 | 0 |
| B: 1 | 70.3 | 0 |
| C: 1 | 58.0 | 0 |
| A: 2 | 75.6 | 0 |
| B: 2 | 77.0 | 0 |
| C: 2 | 79.9 | 0 |

Example 4

The sample obtained in Example 1 was chemically plated with copper. After rinsing the surface of the sample with superpure water, the sample was immersed for 3 minutes at the room temperature in a solution of zinc chloride ($SnCl_2$:40 g/L HCl (37%): 40 mL/L). The sample was then immersed in a solution of palladium chloride ($PdCl_2$: 0.2 g/L, HCl (37%): 3 mL/L) for 3 minutes also at the room temperature. After another rinsing, the sample was immersed in a copper plating bath (copper sulfate: 12.0 g/L, Rossel salt: 30.0 g/L, 36% solution of formaldehyde: 40 mL/L, thiourea: 1 mg/L, pH=12.5) for 1 hour at 50°–70° C. The plated sample was stabilized for 1 hour at 60° C. and then cross-notched at intervals of 1 mm, an adhesive tape was pressed on and pulled off and the number of lattices (100 pieces in total) peeled off was counted. The test result was as shown in Table 7.0% means no lattice peeled off.

TABLE 7

| Sample | Contact angle (degree) | Peeling rate (%) |
|---|---|---|
| A:BL | 94.0 | 100 |
| B:BL | 97.0 | 100 |
| C:BL | 89.7 | 100 |
| A: ① | 70.6 | 0 |
| B: ① | 67.6 | 0 |
| C: ① | 58.0 | 0 |
| A: ② | 71.0 | 0 |
| B: ② | 76.6 | 0 |
| C: ② | 79.0 | 0 |

Example 5

2 sheets of polypropylene homopolymer were treated with a gas of 0.5% fluorine and 99.5% $N_2$ for 10 minutes, stuck together using [Allardite (epoxy type adhesive)] and a pulling test was carried out 24 hours later. The pulling strength was as high as 20 N/mm².

Example 6

After treating a polypropylene homopolymer sheet with a gas of 0.5% fluorine and 99.5% $N_2$ for 10 minutes, one side thereof was coated with [Allardite] for lamination with an aluminum sheet and a pulling test was carried out made 24 hours later. The pulling strength was quite high, being 25 N/mm².

Example 7

2 sheets of polypropylene homopolymer were treated with a gas of 0.5% fluorine and 99.5% $N_2$ for 10 minutes, stuck together using ЗCyanobond] (trade name, cyanoacrylate type adhesive) and a pulling test was carried out 24 hours later. The pulling strength was also quite high, being 25 N/mm².

Example 8

Each of the samples obtained in Example 1 was spray coated with an urethane paint, dried for 1 day, heated for 30 minutes at 80° C. and a peel test was made according to JIS K5400. 8.5. The test result was a shown in Table 8, 0% meaning that there was no indication of peeling.

TABLE 8

| Sample | Contact angle (deg.) | Degree of release (%) |
|---|---|---|
| (A)BL | 94.0 | |
| | 94.0 | 100 |
| (B)BL | 96.3 | |
| | 97.0 | 100 |
| (C)BL | 90.3 | |
| | 89.7 | 100 |
| (A) ① | 62.3 | |
| | 70.6 | 0 |
| (B) ① | 70.3 | |
| | 67.6 | 0 |
| (C) ① | 58.0 | |
| | 58.0 | 0 |
| (A) ② | 75.6 | 20 |
| | 71.0 | 0 |

TABLE 8-continued

| Sample | Contact angle (deg.) | Degree of release (%) |
|---|---|---|
| (B) ② | 71.0 | 0 |
| | 70.8 | 0 |
| (C) ② | 79.0 | 50 |

What is claimed is:

1. A method of plating or coating a surface of a polypropylene product which consists essentially of the steps of contacting the surface of the polypropylene product with a diluted fluorine gas of concentration of 0.1–10% by volume for 1–15 minutes to make it hydrophilic with a surface contact angle of 80 degrees or less, and then plating or coating said surface with a plating agent or coating composition.

* * * * *